(12) United States Patent
Zhu

(10) Patent No.: US 11,788,741 B2
(45) Date of Patent: Oct. 17, 2023

(54) WINDOW FAN AND METHOD FOR QUICKLY ASSEMBLING AND DISASSEMBLING THE SAME

(71) Applicant: Shou Qiang Zhu, Ontario, CA (US)

(72) Inventor: Shou Qiang Zhu, Ontario, CA (US)

(73) Assignee: MAXTON ENGINEERING LTD., Central (HK)

( * ) Notice: Subject to any disclaimer, the term of this patent is extended or adjusted under 35 U.S.C. 154(b) by 180 days.

(21) Appl. No.: 16/936,376

(22) Filed: Jul. 22, 2020

(65) Prior Publication Data

US 2021/0310673 A1 Oct. 7, 2021

Related U.S. Application Data

(60) Provisional application No. 63/003,807, filed on Apr. 1, 2020.

(51) Int. Cl.
| | |
|---|---|
| *F24F 7/013* | (2006.01) |
| *F04D 29/64* | (2006.01) |
| *F24F 11/58* | (2018.01) |
| *F24F 11/89* | (2018.01) |
| *F04D 29/40* | (2006.01) |

(52) U.S. Cl.
CPC ............ *F24F 7/013* (2013.01); *F04D 29/403* (2013.01); *F04D 29/646* (2013.01); *F24F 11/58* (2018.01); *F24F 11/89* (2018.01)

(58) Field of Classification Search
USPC ........................................................ 454/338
See application file for complete search history.

(56) References Cited

U.S. PATENT DOCUMENTS

| | | | | | |
|---|---|---|---|---|---|
| 2,553,172 | A | * | 5/1951 | Carrick | F24F 7/013 |
| | | | | | 312/248 |
| 2,638,761 | A | * | 5/1953 | Henry | F04D 29/263 |
| | | | | | 261/24 |
| 3,722,395 | A | | 3/1973 | Courchesne | |
| 3,890,061 | A | * | 6/1975 | Nechay | F04D 29/263 |
| | | | | | 416/134 R |
| 4,147,470 | A | * | 4/1979 | Brooks | F04D 29/263 |
| | | | | | 416/241 A |

(Continued)

FOREIGN PATENT DOCUMENTS

| | | | | | |
|---|---|---|---|---|---|
| CN | 103228927 | A | * | 7/2013 | ........... F04D 29/263 |
| CN | 108518354 | A | * | 9/2018 | ........... F04D 25/105 |

(Continued)

*Primary Examiner* — Edelmira Bosques
*Assistant Examiner* — Frances F. Hamilton
(74) *Attorney, Agent, or Firm* — LIU & LIU

(57) ABSTRACT

A window fan may include a main body, one or more front fan covers, one or more rear fan covers, one or more fans covered by both the front and rear fan covers, and a control panel. In one embodiment, the front and rear fans can be easily detached from the main body, so the fan can be taken out for cleaning purposes. The control panel can be used to control the wind direction, the magnitude, temperature, etc. of the fans. In one embodiment, the control panel can be operated manually. In another embodiment, the control panel can be operated through a remote control. In a further embodiment, the control panel can be operated through an electronic device, such as a cell phone, a tablet, a computer, etc. via WIFI, Bluetooth or other communication schemes.

14 Claims, 16 Drawing Sheets

(56) References Cited

U.S. PATENT DOCUMENTS

| | | | |
|---|---|---|---|
| 4,197,054 A * | 4/1980 | Morrill | F04D 29/34 |
| | | | 416/214 R |
| 4,773,310 A * | 9/1988 | Corwin | F24F 8/108 |
| | | | 454/244 |
| 5,046,407 A | 9/1991 | Nielsen et al. | |
| 5,190,496 A | 3/1993 | Shih-Chin | |
| 5,297,991 A * | 3/1994 | Smith | F24F 7/013 |
| | | | 454/208 |
| 5,334,091 A | 8/1994 | Shih-Chin | |
| 5,501,010 A * | 3/1996 | Scott | F04D 19/002 |
| | | | 29/889.3 |
| 5,660,605 A | 8/1997 | Chan et al. | |
| 5,971,847 A * | 10/1999 | Webb | F24F 13/075 |
| | | | 454/316 |
| 6,136,057 A | 10/2000 | Dang et al. | |
| 7,083,110 B2 | 8/2006 | Kim et al. | |
| 7,959,419 B2 * | 6/2011 | Borowski | H05K 7/20172 |
| | | | 417/423.15 |
| 8,155,797 B2 | 4/2012 | Wiese | |
| 8,474,728 B2 | 7/2013 | Cislo | |
| 10,001,288 B1 * | 6/2018 | Yang | F24F 11/79 |
| 10,168,679 B2 | 1/2019 | Tyson | |
| 10,267,087 B2 | 4/2019 | Takada | |
| 10,808,956 B2 | 10/2020 | Soyyigit | |
| 10,859,279 B2 * | 12/2020 | Kim | F24F 13/28 |
| 2003/0188520 A1 * | 10/2003 | Boulva | B01D 46/106 |
| | | | 55/467 |
| 2007/0042703 A1 | 2/2007 | Lee | |
| 2012/0164935 A1 * | 6/2012 | Ha | F24F 6/06 |
| | | | 454/337 |
| 2013/0034453 A1 * | 2/2013 | Kojima | H02K 5/1675 |
| | | | 29/888.025 |
| 2016/0033151 A1 * | 2/2016 | Jacobs | F24F 7/013 |
| | | | 454/208 |
| 2017/0030362 A1 * | 2/2017 | Zhu | F04D 17/04 |
| 2019/0085861 A1 * | 3/2019 | Densborn | F04D 17/16 |
| 2020/0224423 A1 | 7/2020 | Jacobsen et al. | |
| 2021/0381518 A1 * | 12/2021 | Horton | F24F 13/20 |

FOREIGN PATENT DOCUMENTS

| | | | | |
|---|---|---|---|---|
| DE | 102007003635 A1 * | 7/2008 | | F16B 21/04 |
| GB | 1004559 A * | 9/1965 | | |
| KR | 200379797 Y1 * | 3/2005 | | |
| KR | 20110045206 A * | 4/2011 | | |
| KR | 200492734 Y1 * | 2/2020 | | |

* cited by examiner

WINDOW FAN AND METHOD FOR QUICKLY ASSEMBLING AND DISASSEMBLING THE SAME

CROSS-REFERENCE TO RELATED APPLICATIONS

This application claims priority under 35 U.S.C. § 119 (e) to U.S. Provisional Patent Application Ser. No. 63/003,807, filed on Apr. 1, 2020, the entire contents of which are hereby incorporated by reference.

FIELD OF THE INVENTION

The present invention is directed to a fan, and in particular to a window fan that is portable and can be easily assembled and disassembled.

BACKGROUND OF THE INVENTION

Current window fans generally include a fan unit and a motor. The fan unit having a blower housing with a blower rotates relative to a fan base. The blower inside the blower housing may include a plurality of blades at different elevations to generate the cooling effect, and a shaft is engaged with the blower housing. The motor may be disposed on at least one end of the vertical shaft to rotate the fan unit.

However, most of the conventional window fans are difficult to be cleaned or repaired because there are too many components in conventional window fans as disclosed in U.S. Pat. No. 5,190,496 to Shao, and tools are usually needed to disassemble it when the user wants to clean the fan.

U.S. Pat. No. 5,660,605 to Chan et al. discloses a powered window fax having a removable air filter. The fan has a housing into which one or more filter elements are removably inserted. As shown in FIG. 1, once the window fan is fixed to the window, it is difficult for the user to remove the window fan from one window and install it to another. Also, even though the filters can be removable from the window fan, the entire window fan is difficult to clean because the user still needs tools to remove the window fan from the window and disassemble it to clean. Therefore, there remains a need for a new and improved window fan to overcome the problems stated above.

SUMMARY OF THE INVENTION

In one aspect, a window fan may include a main body, one or more front fan covers, one or more rear fan covers, one or more fan units covered by both the front and rear fan covers, and a control panel. In one embodiment, the front fan covers and rear fan covers can be detached easily from the main body, so the fans can be taken out for cleaning purposes.

The control panel can be used to control the fan units of the window fan. More specifically, the control panel can control the wind direction, the magnitude, temperature, etc. of the fan units. In one embodiment, the control panel can be operated manually. In another embodiment, the control panel can be operated through a remote control. In a further embodiment, the control panel can be operated through an electronic device, such as an APP on a cell phone, a tablet, a computer, etc. via WIFI, Bluetooth or other communication schemes.

It is note that since the window fan in the present invention is symmetric, the discussion on how to assemble or disassemble the window fan on one side would be identical to the other side. In one embodiment, the front fan cover has an indicator to indicate that the front fan cover is locked and can be further secured through a first locking latch. To take the front fan cover out from the main body, the user can pull the first locking latch out, rotate the indicator in a clockwise manner to an unlock sign, and the front fan cover can be easily taken out from the main body.

The window fan has a receiving space housing a threaded shaft that is inserted into a center hole of the fan, so the fan unit can rotate around the shaft when it is turned on. To further secured the fan unit on the shaft, a securing unit is disposed on top of the fan unit. More specifically, the securing unit has a threaded through hole that can be threadedly engaged with the shaft to rotate down to tighten the securing unit on the shaft. The shaft is connected with a motor to drive the fan unit. It is noted that the securing unit has a movable locking unit to further secure the securing unit on the shaft.

To remove the fan unit from the receiving space of the window fan, the locking unit is first pulled out to unlock the securing unit on the shaft and the securing unit can be threadedly rotated up and eventually detached from the shaft. Once the securing unit is removed, the fan unit can also be taken out from the shaft.

Like the front fan cover, the rear fan cover also has an indicator to indicate that the front fan cover is locked and can be further secured through a second locking latch. To take the rear fan cover out from the rear main body, the user can pull the second locking latch out, rotate the indicator in a clockwise manner to an unlock sign, and the front fan cover can be easily taken out from the rear main body.

As stated above, the window fan in the present invention is symmetric, and how to assemble or disassemble the window fan on one side would be identical to the other side. Thus, the front fan cover on the other side can be removed from the main body when the first locking latch is pulled out and the indicator is rotated to an unlock sign; and the rear fan cover can be removed from the rear main body in the same manner. Likewise, the fan unit can be taken out when the securing unit is disengaged with the shaft and detached therefrom. Thus, the window fan in the present invention is advantageous because it can be easily disassembled for cleaning purposes, and the front/rear fan covers and the fan unit can be easily put back when reversing the steps of disassembling.

It is also noted that the window fan has a safety design to assure the fan cover is secured and locked, otherwise the fan will not be turned on. More specifically, on a predetermined position on a periphery of the receiving space, a engaging recess is formed near the lock/unlock sign to receive a protrusion on the periphery of the front fan cover. Also, a safety switch is electrically connected to the control panel and the fan can be turned on only when the safety switch is pressed down. The front fan cover along with the protrusion can be pressed down in the engaging recess and rotate in a counterclockwise manner into an engaging groove to be securely disposed, where a safety switch is disposed at the bottom portion of the engaging groove and an evading corner is used to facilitate the protrusion to slide into the engaging groove and simultaneously press down the safety switch. Namely, the front fan cover has to be securely disposed on the main body to press down the safety switch to turn on the window fan when the power is on.

In another aspect, a method for assembling a window fan may include steps of: providing a main body of the window fan having one or more receiving space for a fan unit and a shaft longitudinally extending from substantially center of the receiving space; inserting the fan unit into the receiving space to enable the fan unit to rotate around the shaft; disposing a securing unit threadedly engaged with the shaft to prevent the fan unit from detaching from the shaft; and providing a front fan cover and a rear fan cover to protect the fan unit inside the receiving space.

DETAILED DESCRIPTION OF THE INVENTION

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

As used in the description herein and throughout the claims that follow, the meaning of "a", "an", and "the" includes reference to the plural unless the context clearly dictates otherwise. Also, as used in the description herein and throughout the claims that follow, the terms "comprise or comprising", "include or including", "have or having", "contain or containing" and the like are to be understood to be open-ended, i.e., to mean including but not limited to. As used in the description herein and throughout the claims that follow, the meaning of "in" includes "in" and "on" unless the context clearly dictates otherwise.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Figure 1:
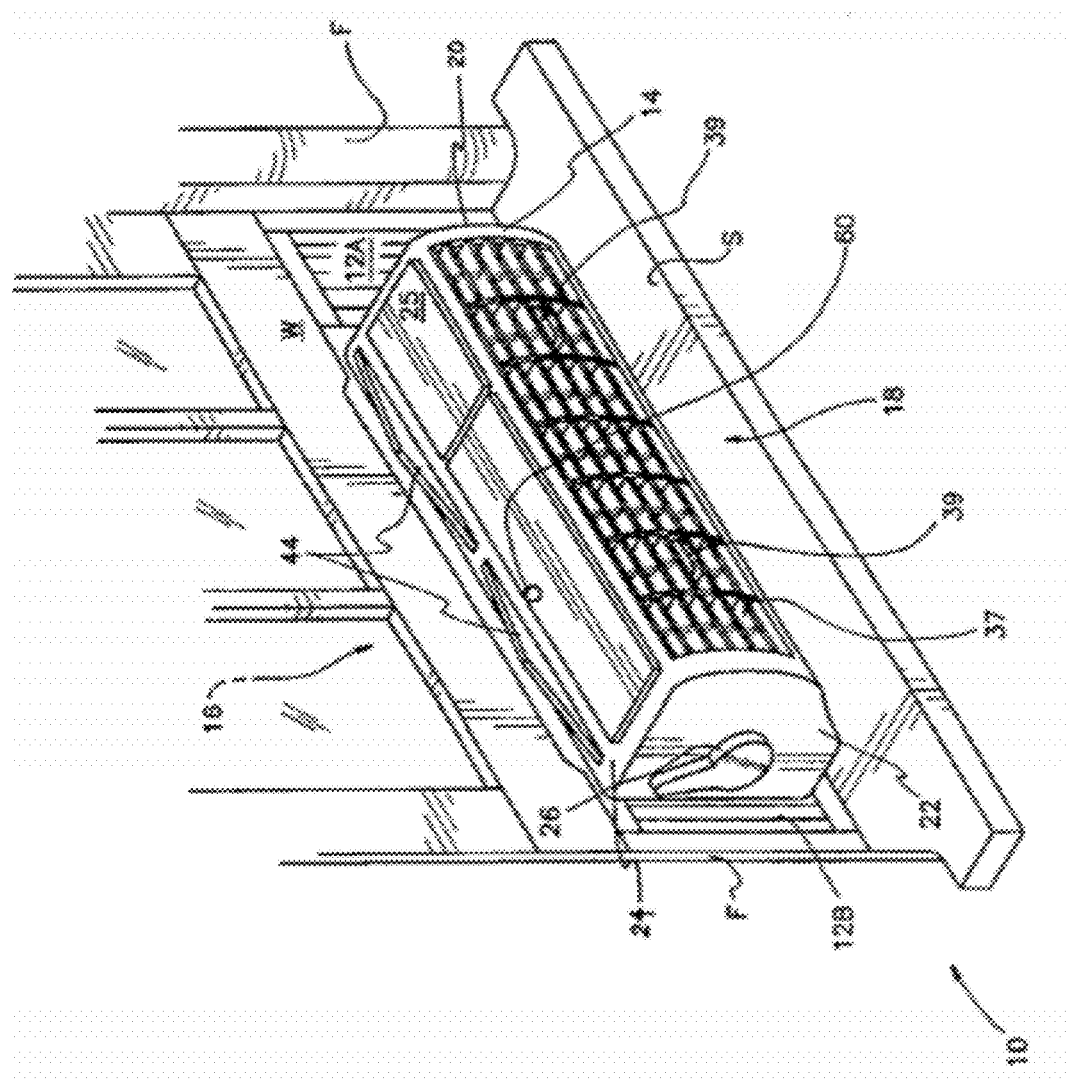
FIG. 1 illustrates a prior art of a conventional window fan that is fixed to the window.
Figure 2:
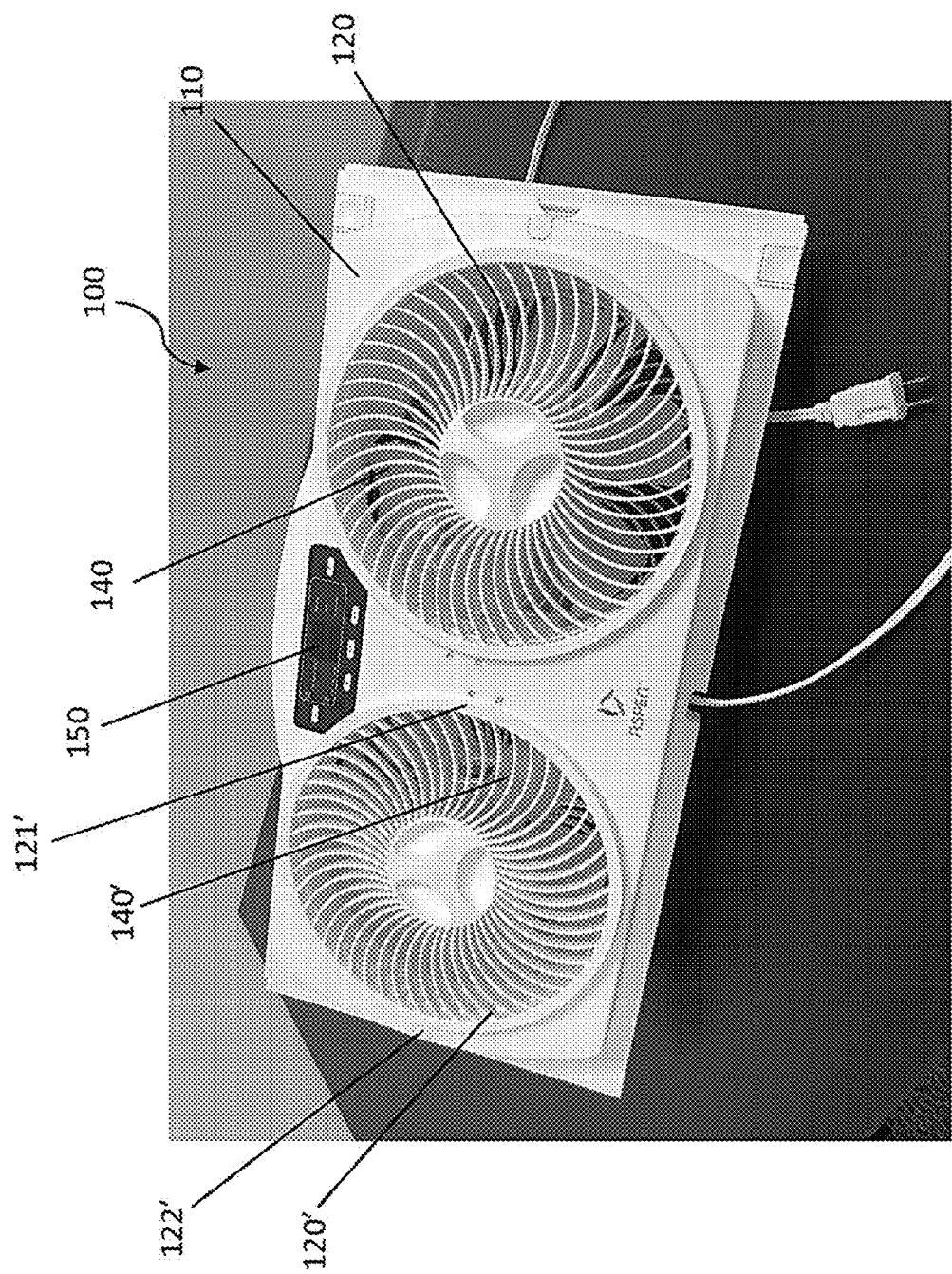
FIG. 2 is a schematic view of a front portion of the window fan in the present invention.
Figure 3:
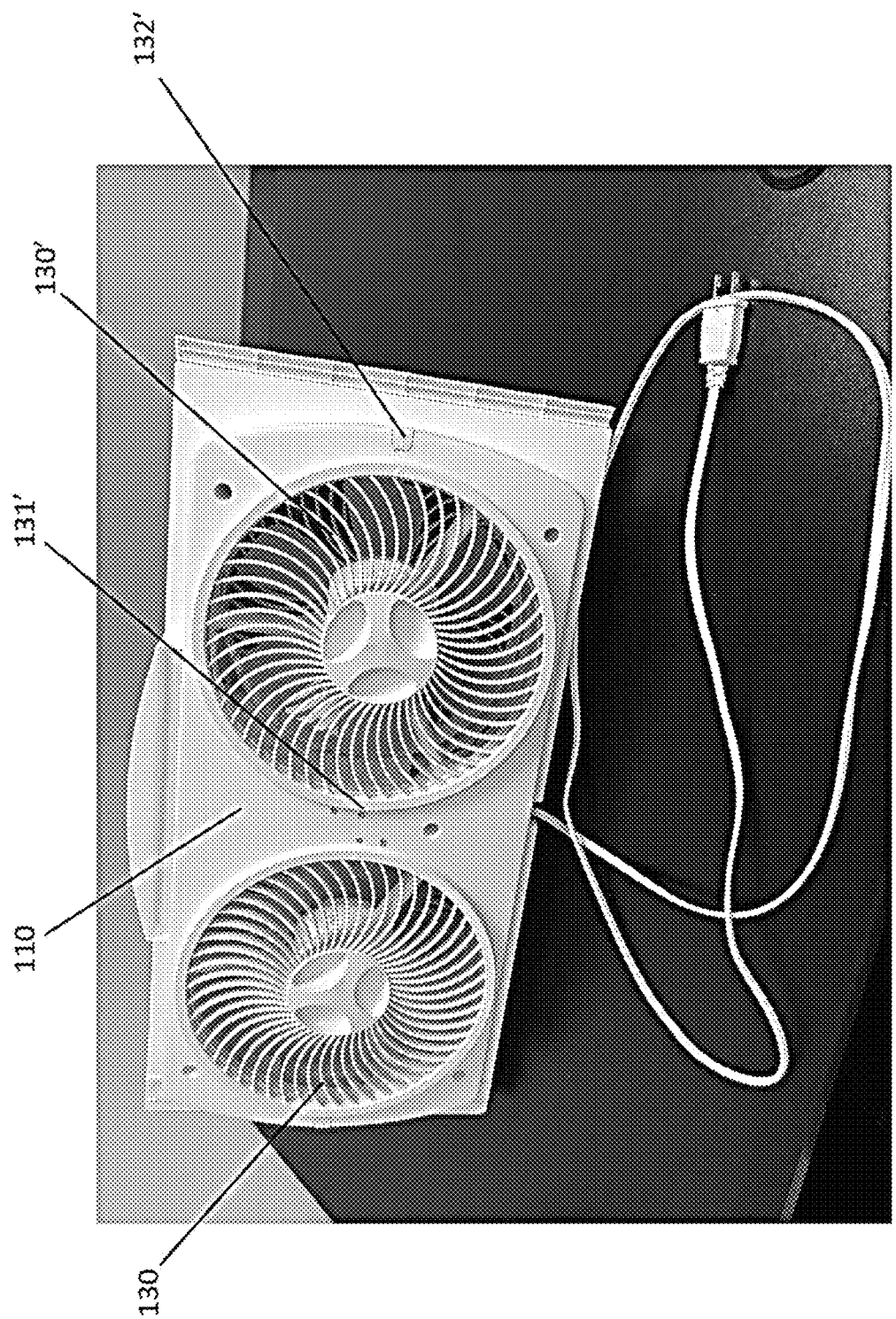
FIG. 3 is a schematic view of a rear portion of the window fan in the present invention.

In one aspect, referring to FIGS. 2 and 3, a window fan 100 may include a main body 110, one or more front fan covers (120, 120'), one or more rear fan covers (130, 130'), one or more fan units (140, 140') covered by both the front and rear fan covers, and a control panel 150. In one embodiment, the front fan covers (120, 120') and rear fan covers (130, 130') can be detached from the main body 110, so the fan units (140, 140') can be taken out for cleaning purposes.

The control panel 150 can be used to control the fan units (140, 140') of the window fan 100. More specifically, the control panel 150 can control the wind direction, the magnitude, temperature, etc. of the fan units (140, 140'). In one embodiment, the control panel 150 can be operated manually. In another embodiment, the control panel 150 can be operated through a remote control. In a further embodiment, the control panel 150 can be operated through an electronic device, such as an APP on a cell phone, a tablet, a computer, etc. via WIFI, Bluetooth or other communication schemes.

Figure 4:
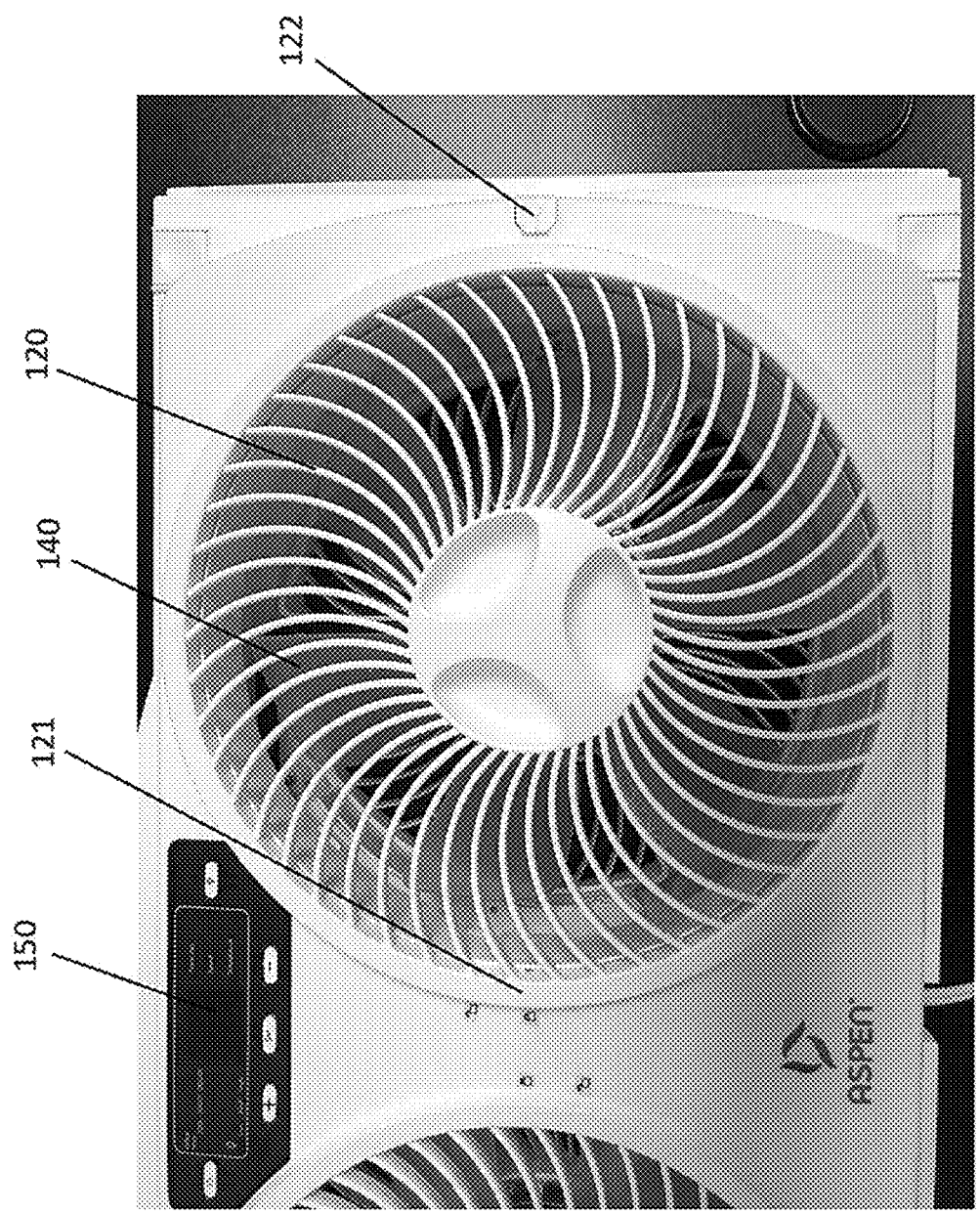
FIG. 4 is a schematic view of one side of the window fan when the font fan cover is locked.
Figure 5:
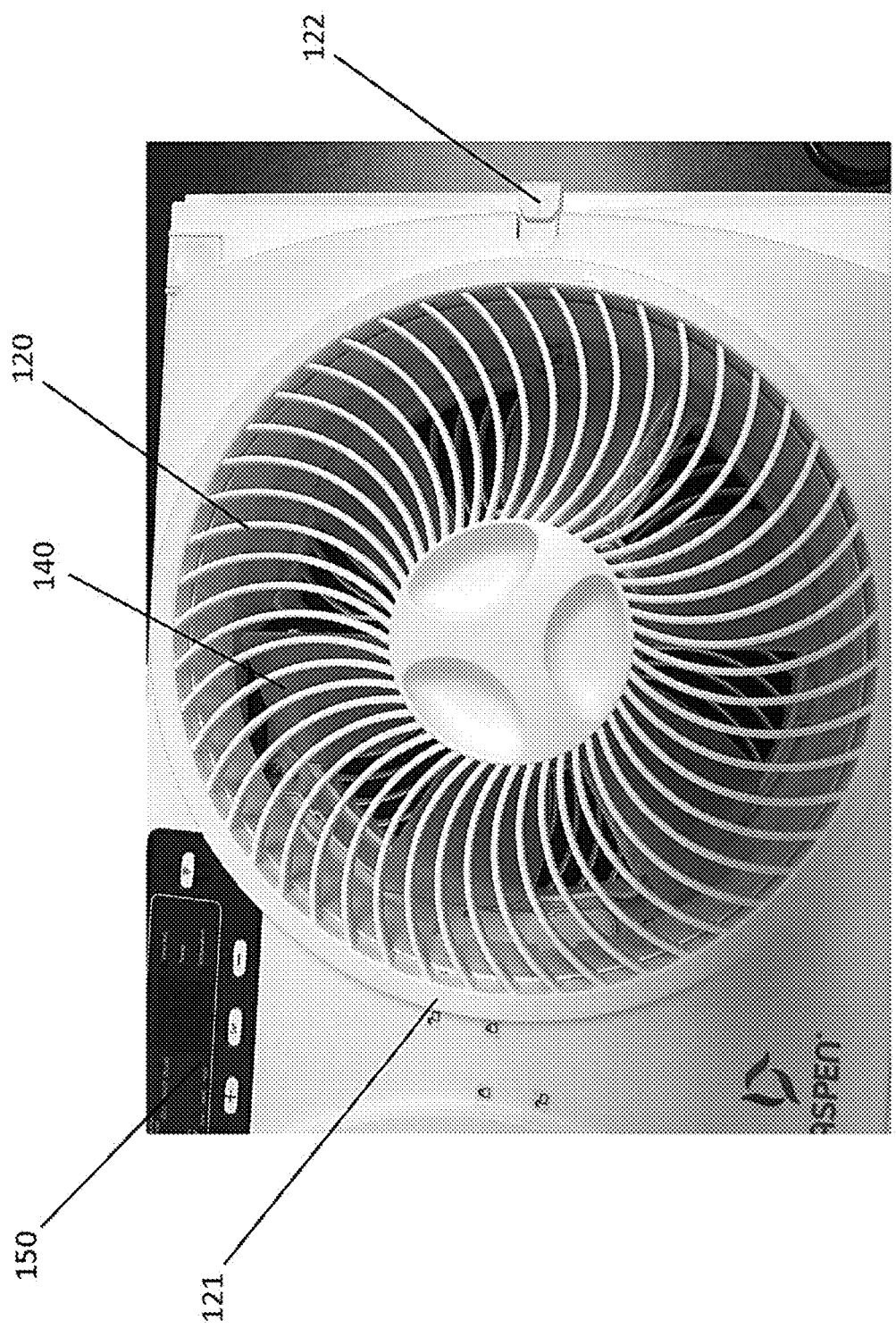
FIG. 5 is a schematic view of one side of the window fan when the font fan cover is unlocked.

It is note that since the window fan 100 in the present invention is symmetric, the discussion on how to assemble or disassemble the window fan on one side would be identical to the other side. In one embodiment, the front fan cover 120 has an indicator 121 to indicate that the front fan cover 120 is locked and can be further secured through a first locking latch 122, as shown in FIG. 4. To take the front fan cover 120 out from the main body 110, the user can pull the first locking latch 122 out, rotate the indicator 121 in a clockwise manner to an unlock sign as shown in FIG. 5, and the front fan cover 120 can be easily taken out from the main body 110 as shown in FIG. 6.

Figure 6:
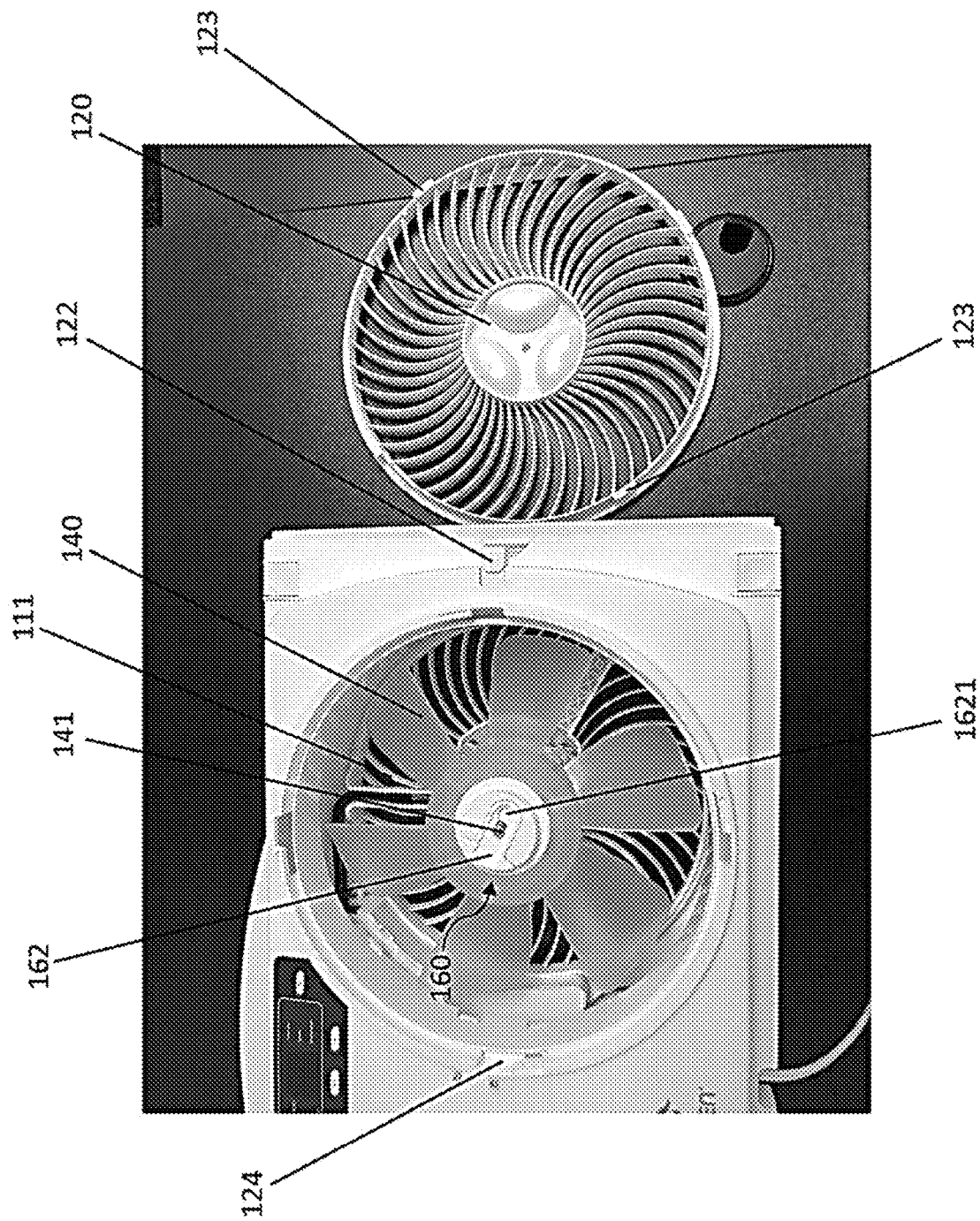
FIG. 6 is a schematic view of one side of the window fan when the font fan cover is removed therefrom.

Still referring to FIG. 6, the window fan has a receiving space 111 housing a threaded shaft 141 that is inserted into a center hole of the fan unit 140, so the fan unit 140 can rotate around the shaft 141 when it is turned on. The shaft 141 is connected with a motor 142 to drive the fan unit 140. To further secured the fan unit 140 on the shaft 141, a securing unit 160 is disposed on top of the fan unit 140. More specifically, the securing unit 160 has a threaded through hole 161 (see FIG. 8) that can be threadedly engaged with the shaft 141 to rotate down to tighten the securing unit 160 on the shaft 141. It is noted that the securing unit 160 has a movable locking unit 162 to further secure the securing unit 160 on the shaft 141. More specifically, the locking unit has two connected openings (1621, 1622), and the opening 1621 is slightly larger than the other 1622. The securing unit 160 is further secured on the shaft 141 when the smaller opening (1622) is moved to engage with the shaft 141 is moved to engage with the shaft 141.

Figure 7:
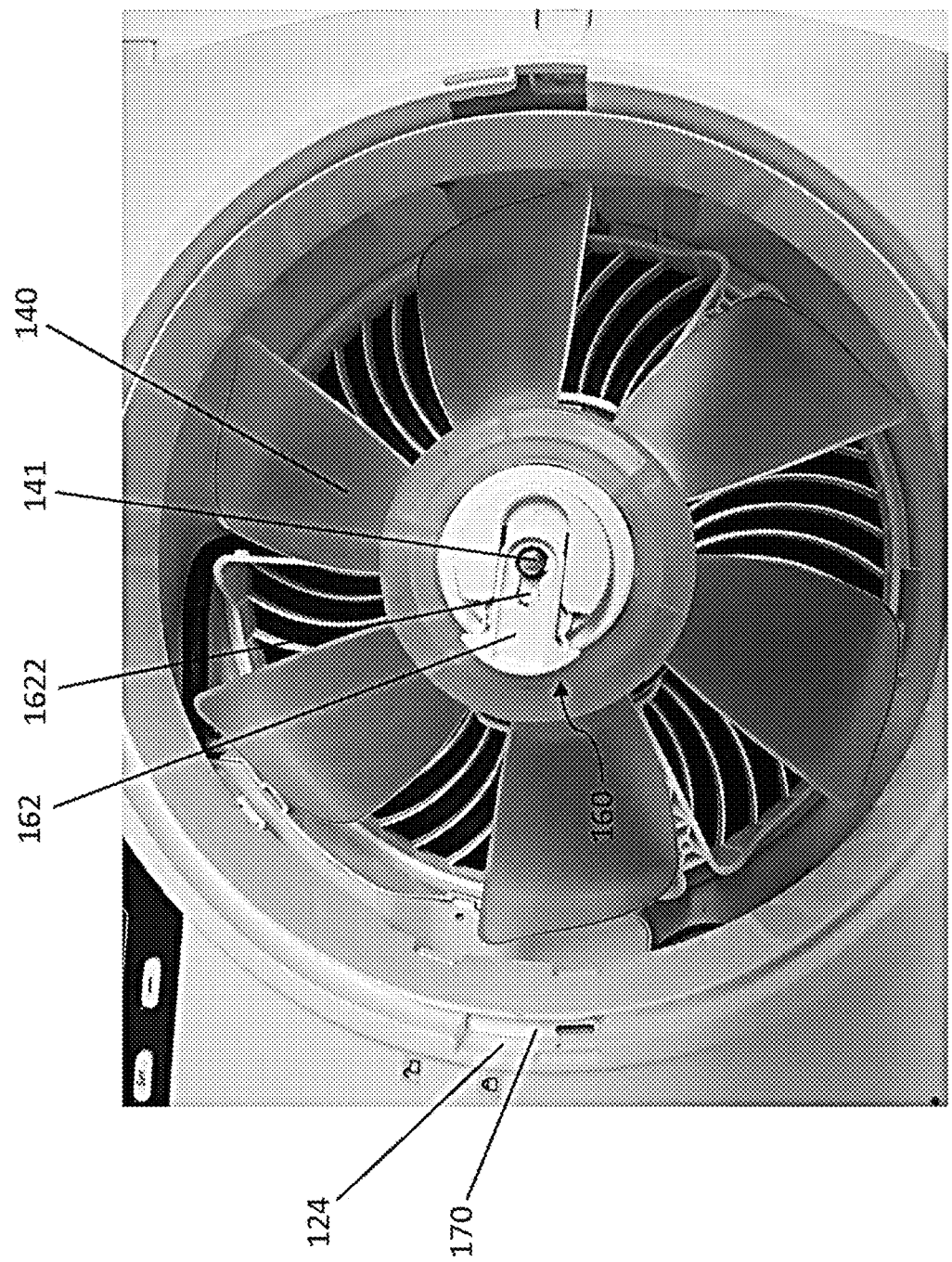
FIG. 7 is a schematic view of one side of the window fan with a partially enlarged view of the fan unit.
Figure 8:
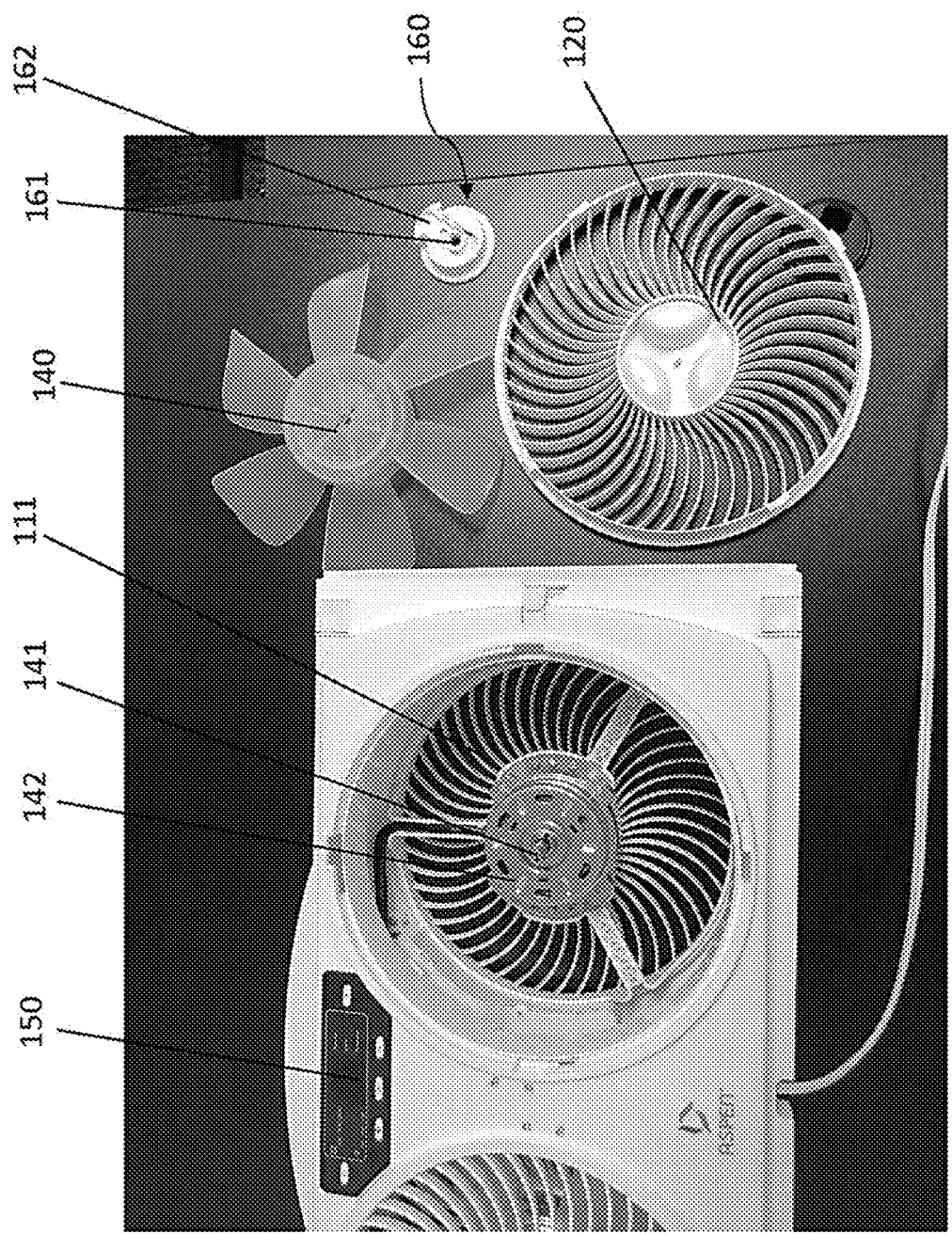
FIG. 8 is a schematic view of one side of the window fan when the fan is taken out from the receiving space.

To remove the fan unit 140 from the receiving space 111 of the window fan 100, as shown in FIGS. 6 to 8, the locking unit 162 is first pulled out to unlock the securing unit 160 on the shaft 141 and the securing unit 160 can be threadedly rotated up and eventually detached from the shaft 141. Once the securing unit 160 is removed, the fan unit 140 can also be taken out from the shaft 141 as shown in FIG. 8.

Figure 9:
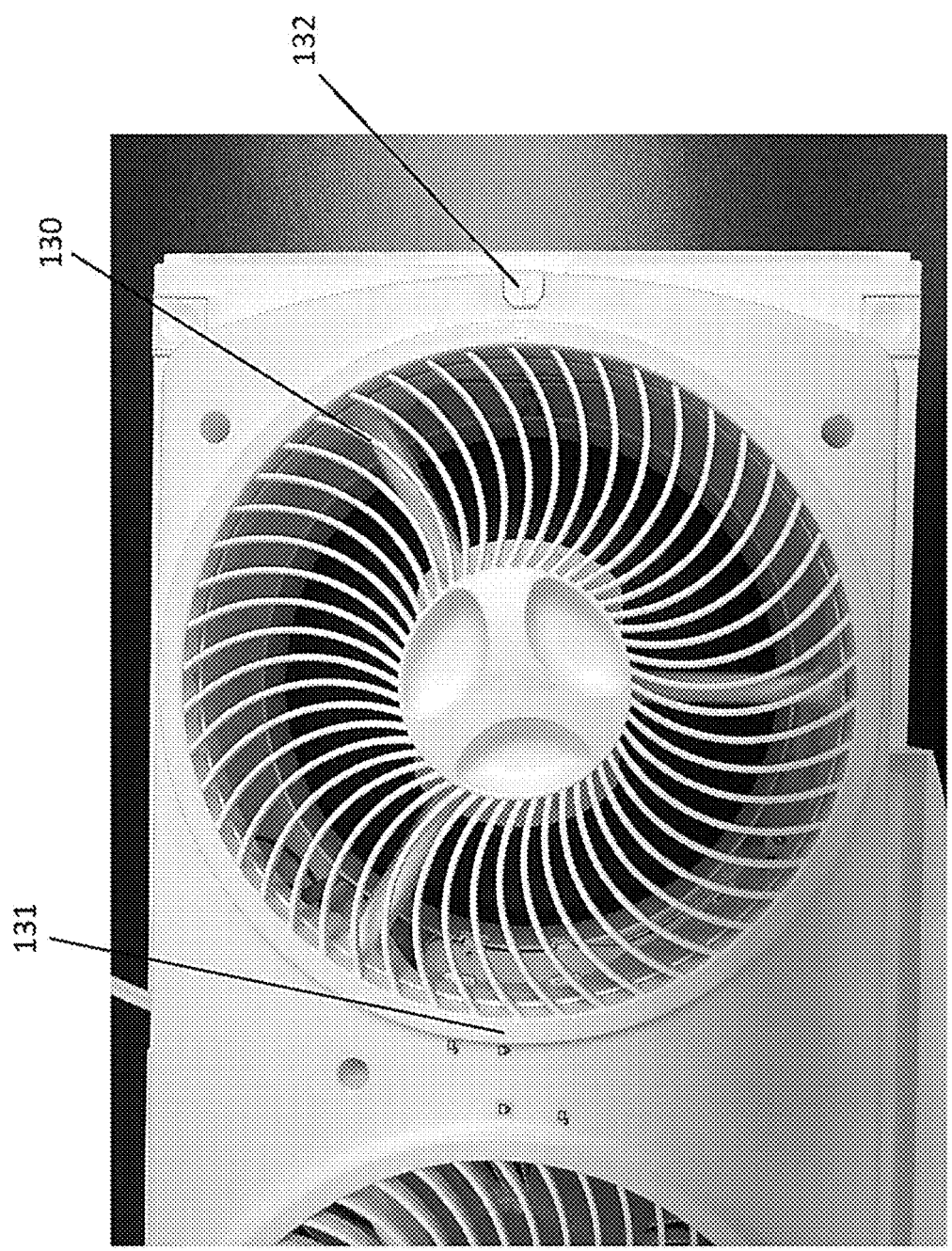
FIG. 9 is a schematic view of one side of the window fan when the rear fan cover is locked.
Figure 10:
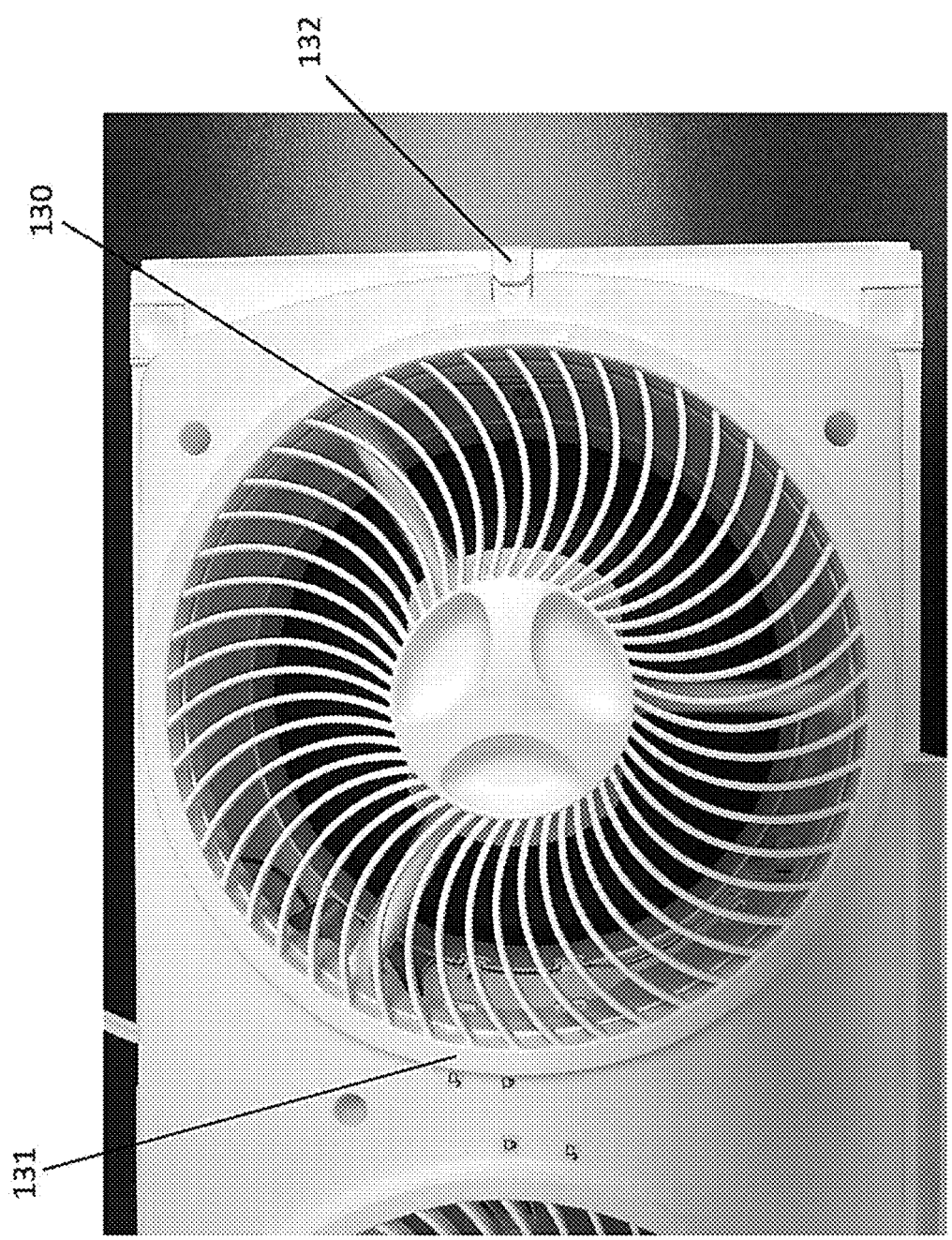
FIG. 10 is a schematic view of one side of the window fan when the rear fan cover is unlocked.
Figure 11:
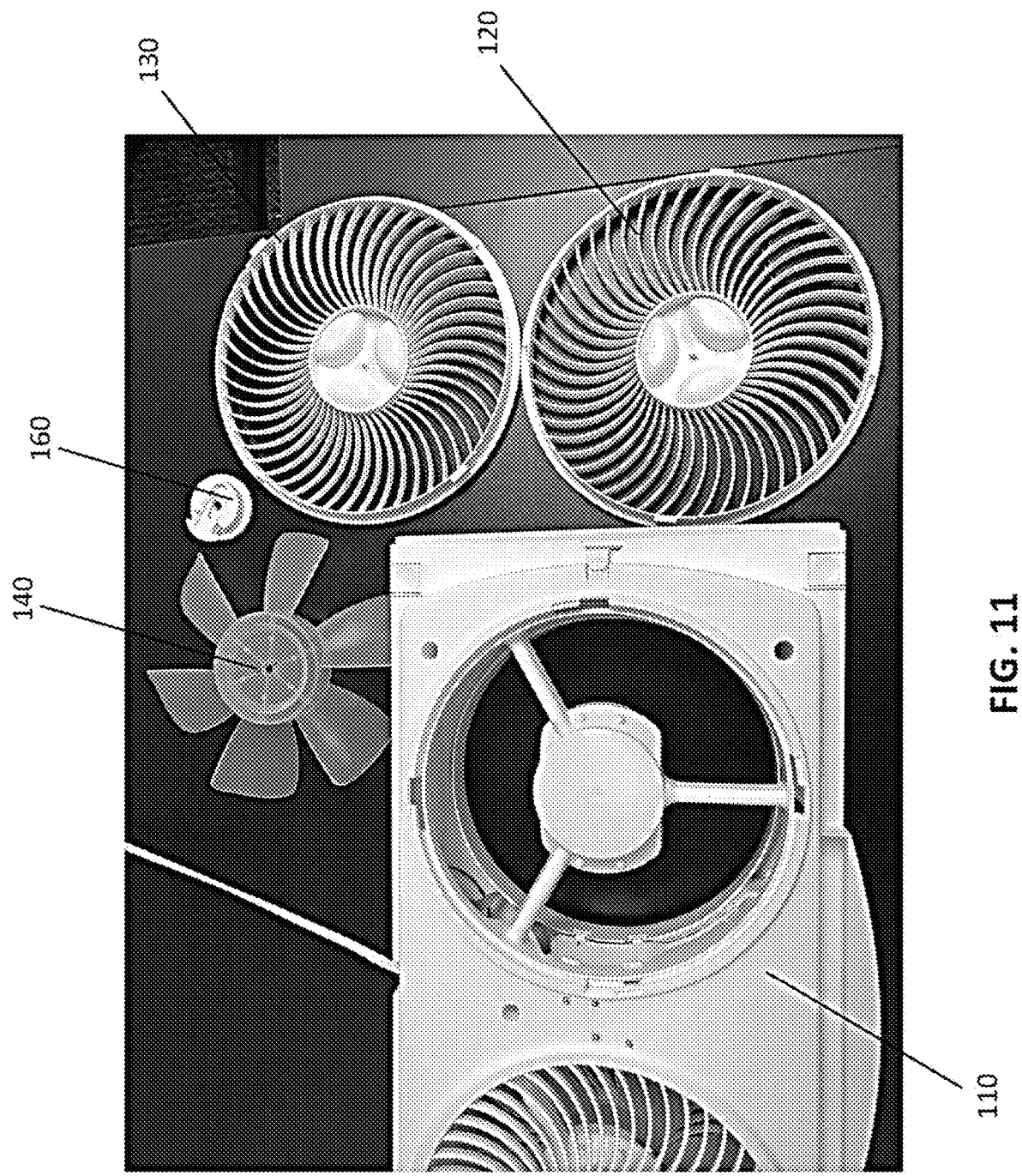
FIG. 11 is a schematic view of one side of the window fan that has been disassembled.

As shown in FIG. 9, like the front fan cover 120, the rear fan cover 130 also has an indicator 131 to indicate that the front fan cover 130 is locked and can be further secured through a second locking latch 132. To take the rear fan cover 130 out from the rear main body 110, the user can pull the second locking latch 132 out, rotate the indicator 131 in a clockwise manner to an unlock sign as shown in FIG. 10, and the front fan cover 130 can be easily taken out from the rear main body 110 as shown in FIG. 11.

Figure 12:
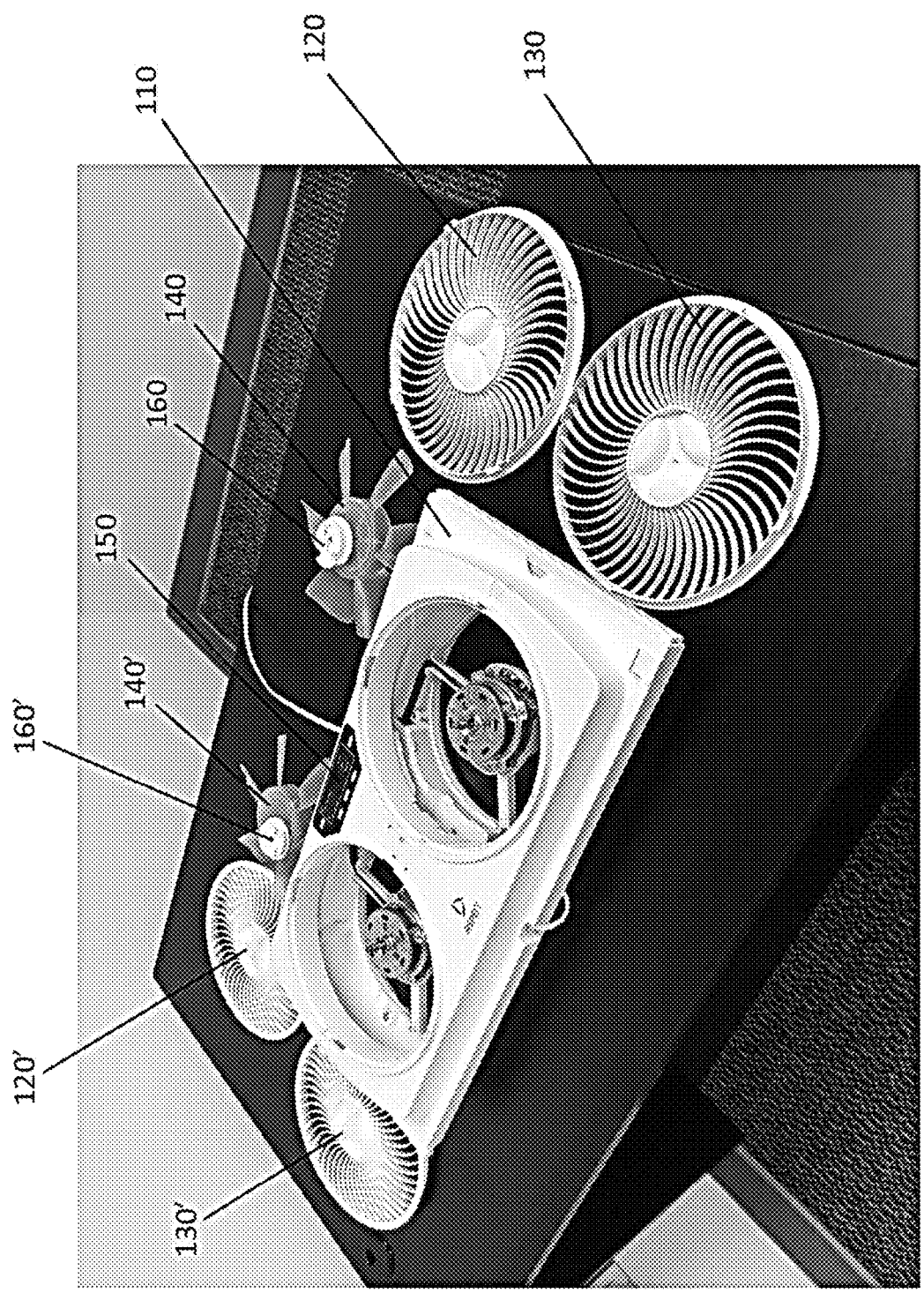
FIG. 12 is a schematic view of the entire window fan that has been disassembled.

As stated above, the window fan 100 in the present invention is symmetric, and how to assemble or disassemble the window fan on one side would be identical to the other side. Thus, the front fan cover 120' on the other side can be removed from the main body 110 when the first locking latch 122' is pulled out and the indicator 121' is rotated to an unlock sign; and the rear fan cover 130' can be removed from the rear main body 110 in the same manner. Likewise, the fan unit 140' can be taken out when the securing unit 160' is disengaged with the shaft 141' and detached therefrom. As shown in FIG. 12, the window fan 100 can be easily disassembled for cleaning purposes, and the front/rear fan covers and the fan unit can be easily put back when reversing the steps of disassembling.

Figure 13:
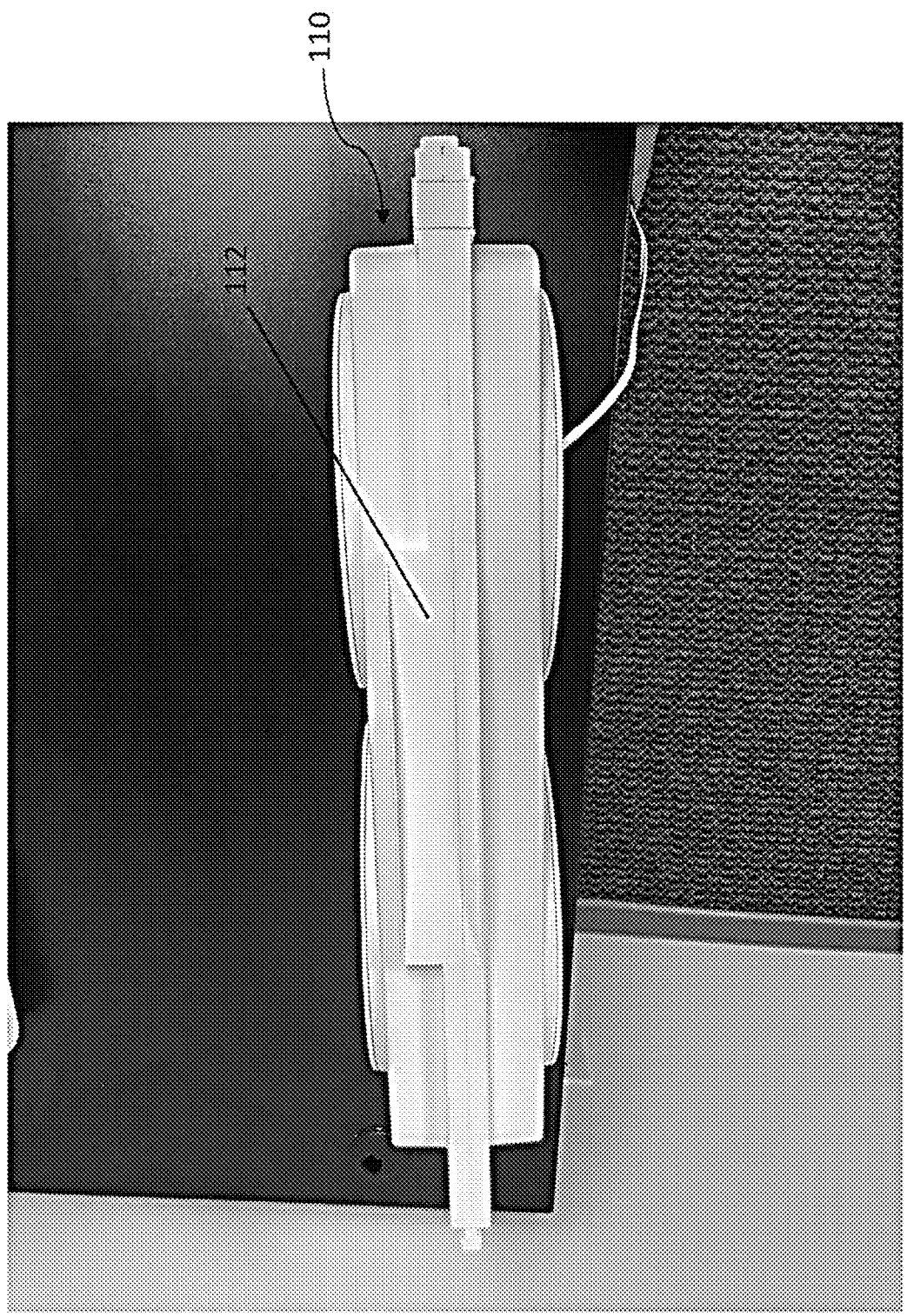
FIG. 13 is a top view of the window fan showing the elongated recess in the present invention.
Figure 14:
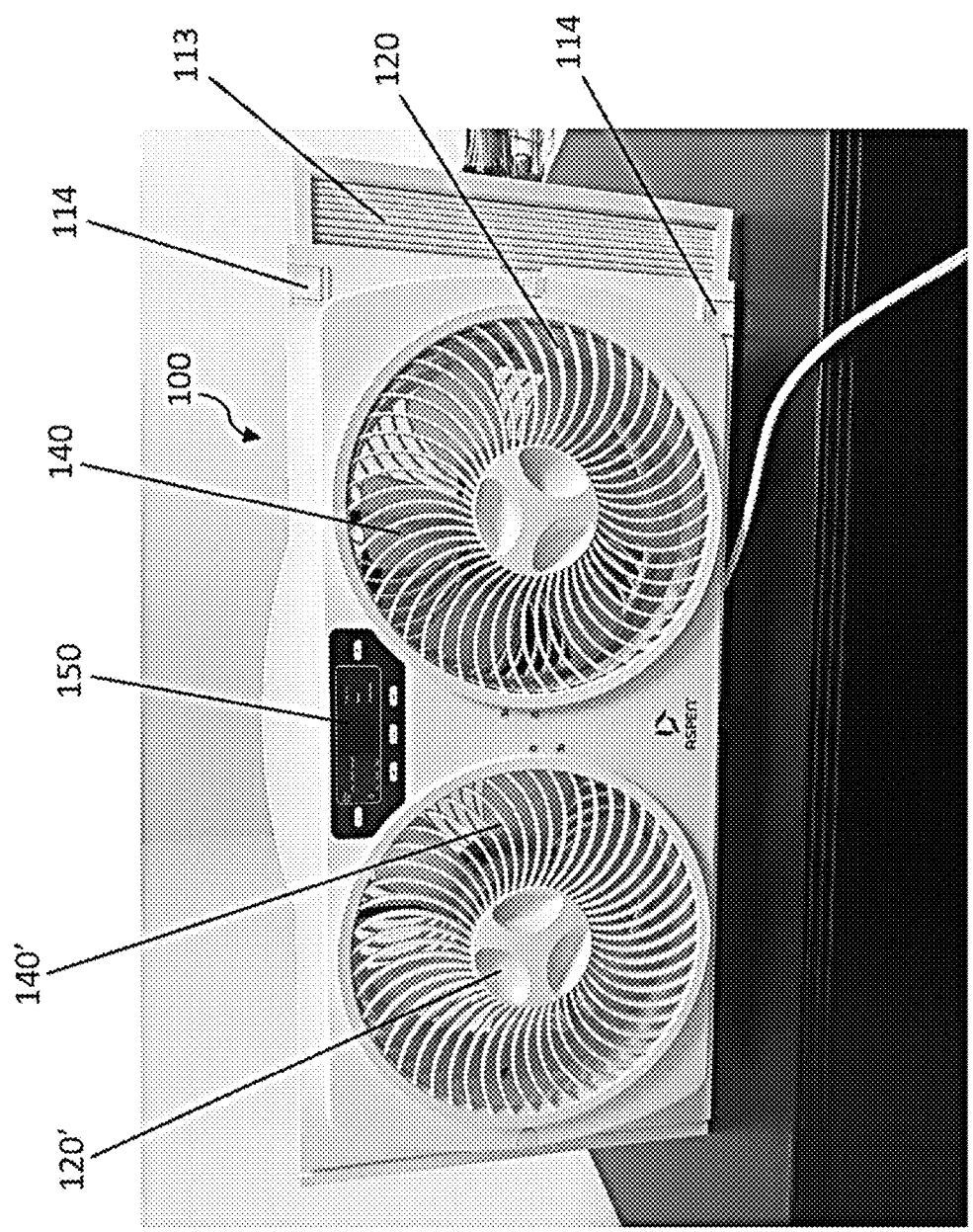
FIG. 14 is a schematic front view of the window fan showing the extension unit in the present invention.

It is note that the window fan 100 in the present invention is not only easy to assemble/disassemble, but portable and can fit any size of the window. As shown in FIG. 13, the main body 110 has an elongated recess 112 located on top of the main body to receive the window that may be pulled down. On the other hand, as shown in FIG. 14, the main body also has a horizontal extension unit 113 that can be laterally pulled out from one side of the main body 110 to adjust the width of the window fan to fit a predetermined size of the window. Once the length of the extension unit 113 is determined, the user can press a pair of securing buttons 114 to lock the position of the extension unit 113.

Figure 15:
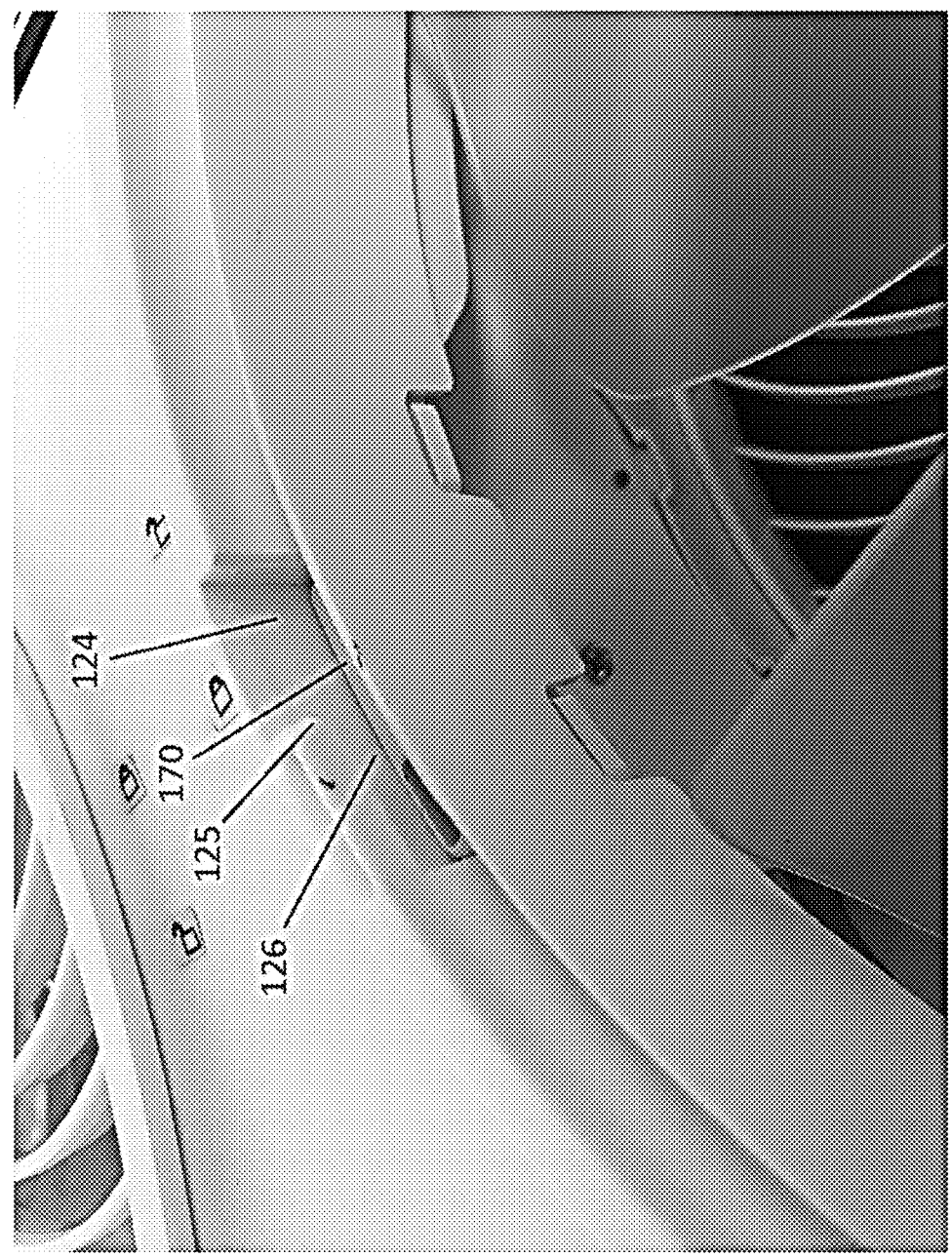
FIG. 15 is a schematic view of the safety design of the window fan including the safety switch, evading corner and the engaging groove in the present invention.

It is also noted that the window fan 100 has a safety design to assure the fan cover is secured and locked, otherwise the fan will not be turned on. More specifically, on a predetermined position on a periphery of the receiving space 111, a engaging recess 124 is formed near the lock/unlock sign to receive a protrusion 123 on the periphery of the front fan cover 120 as shown in FIGS. 6, 7 and 15. Also, a safety switch 170 is electrically connected to the control panel 150 and the fan can be turned on only when the safety switch 170 is pressed down. The front fan cover 120 along with the protrusion 123 can be pressed down in the engaging recess 124 and rotate in a counterclock manner into an engaging groove 126 connected to the engaging recess 124 to be securely disposed, where a safety switch 170 is disposed at the bottom portion of the engaging groove 126 and an evading corner 125 is used to facilitate the protrusion 123 to slide into the engaging groove 126 and simultaneously press down the safety switch 170. Namely, the front fan cover 120 has to be securely disposed on the main body 110 to press down the safety switch 170 to turn on the window fan 100 when the power is on. It is noted that the size of the protrusion 123 is slightly larger than the size of the engaging groove 126, so when the protrusion is slide into the engaging groove with the assistance of the evading corner 125, the safety switch 170 can be pressed down.

Figure 16:
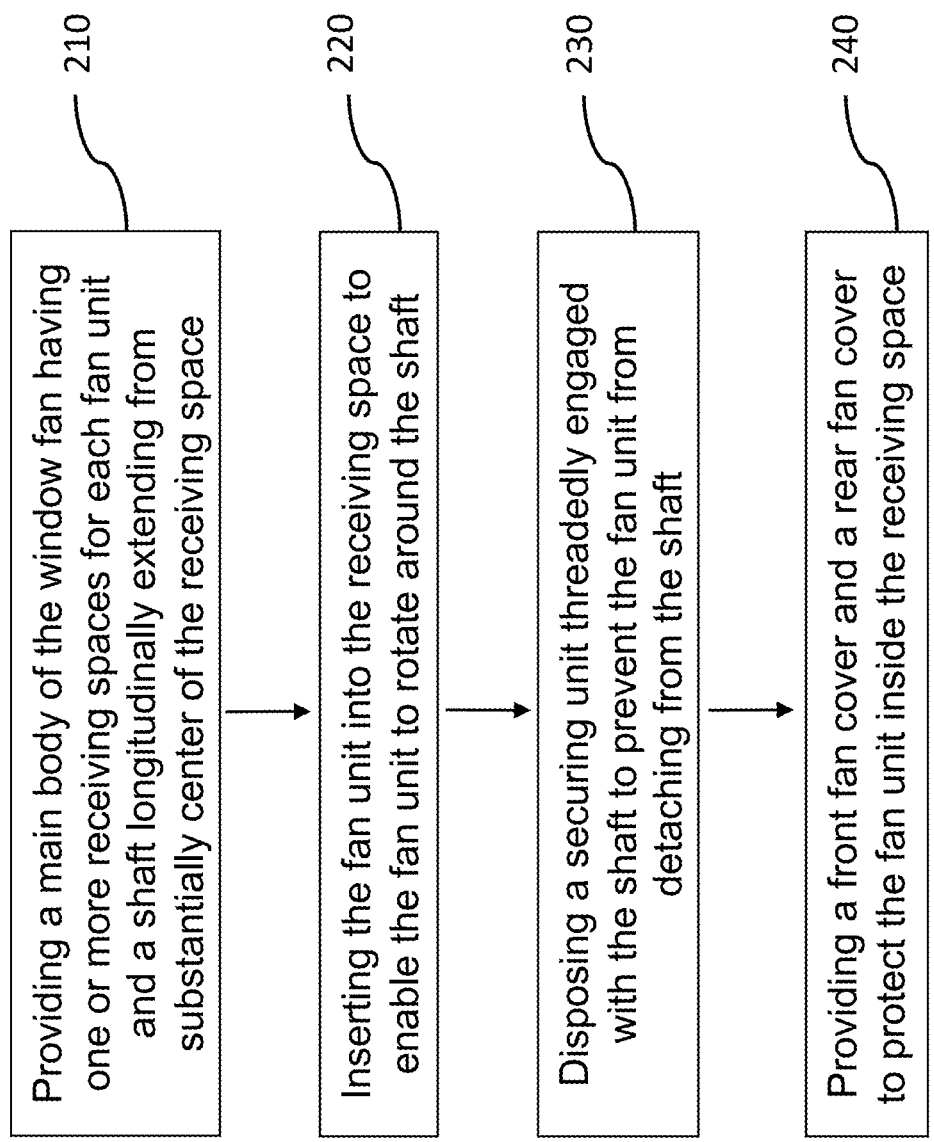
FIG. 16 is a flow diagram of a method of assembling the window fan in the present invention.

In another aspect, as shown in FIG. 16, a method for assembling a window fan may include steps of: providing a main body of the window fan having one or more receiving space for a fan unit and a shaft longitudinally extending from substantially center of the receiving space, step 210; inserting the fan unit into the receiving space to enable the fan unit to rotate around the shaft, step 220; disposing a securing unit threadedly engaged with the shaft to prevent the fan unit from detaching from the shaft, step 230; and providing a front fan cover and a rear fan cover to protect the fan unit inside the receiving space, step 240.

Having described the invention by the description and illustrations above, it should be understood that these are exemplary of the invention and are not to be considered as limiting. Accordingly, the invention is not to be considered as limited by the foregoing description, but includes any equivalents.

What is claimed is:

1. A window fan comprising:
a control panel and a main body that includes at least a receiving space for a fan unit;
a shaft extending from substantially a center position of the receiving space inserting into a through hole of the fan unit to enable the fan unit to rotate in the receiving space around the shaft;
a securing unit threadedly engaged with the shaft to prevent the fan unit from detaching from the shaft, wherein the securing unit can be further secured on the shaft through a locking unit that comprises a slidable member having connected first and second openings, with the first opening slightly larger than the second opening, wherein the securing unit is disposed on top of a slidable member having two connected first and second openings, with the first opening slightly larger than the first opening, wherein the securing unit is disposed on top of the fan unit, and wherein the securing unit has a threaded through hole that can be threadedly engaged with the shaft to rotate down to tighten the securing unit on the shaft, wherein the shaft extends through the first opening in the slidable member, and the slidable member is moved to engage the smaller second opening with the shaft thereby securing the securing unit on the shaft; and
a front fan cover and a rear fan cover to protect the fan unit inside the receiving space.

2. The window fan of claim 1, wherein the front fan cover and rear fan cover can be further secured on the main body through a first locking latch and a second locking latch, respectively.

3. The window fan of claim 1, wherein the control panel can be operated through an electronic device, using an app on a cell phone, a tablet, a computer, via an electronic device, using an APP on a cell phone, a tablet, or a computer via WIFI, Bluetooth or other communication schemes.

4. The window fan of claim 1, wherein the control panel is used to control the fan unit, including wind direction and magnitude.

5. The window fan of claim 4, wherein the control panel can be operated through an electronic device, using an app on a cell phone, a tablet, a computer, via an electronic device, using an APP on a cell phone, a tablet, a computer, via WIFI, Bluetooth or other communication schemes.

6. The window fan of claim 1, wherein the main body has a perimeter that is sized and shaped to engage and mount to a window frame.

7. The window fan of claim 1, wherein the front fan cover has at least one protrusion that can be pressed down into an engaging recess from at a predetermined position on a periphery of the receiving space, and the front fan cover along with the protrusion is rotated to enable the protrusion to slide into an engaging groove connected with the engaging recess to securely dispose the front fan cover.

8. The window fan of claim 7, wherein a safety switch electrically connected with the control panel is disposed at a bottom portion of the engaging groove and the window fan can be turned on only when the safety switch is pressed down by the protrusion slid into the engaging groove.

9. A method for assembling a window fan comprising steps of:
  providing a main body of the window fan having at least a receiving space for a fan unit and a shaft longitudinally extending from substantially center of the receiving space;
  inserting the shaft a through hole of the fan unit and inserting the fan unit into the receiving space to enable the fan unit to rotate in the receiving space around the shaft;
  disposing a securing unit threadedly engaged with the shaft on top of the fan unit to prevent the fan unit from detaching from the shaft;
  securing the shaft through a locking unit that comprises a slidable member having connected first and second openings, with the first opening slightly larger than the second opening;
  rotating down the securing unit to tighten the securing unit on the shaft;
  extending the shaft through the first opening in the slidable member, and the slidable member is moved to engage the smaller second opening with the shaft thereby securing the securing unit on the shaft; and
  providing a front fan cover and a rear fan cover to protect the fan unit inside the receiving space.

10. The method for assembling a window fan of claim 9, wherein the window fan can be quickly disassembled by removing the front fan covers and rear fan covers, disengaging the securing unit from the shaft, and removing the fan unit from the shaft.

11. The method for assembling a window fan of claim 9, wherein the front fan cover has at least one protrusion that can be pressed down into an engaging recess from at a predetermined position on a periphery of the receiving space, and the front fan cover along with the protrusion is rotated to enable the protrusion to slide into an engaging groove connected with the engaging recess to securely dispose the front fan cover.

12. The method for assembling a window fan of claim 9, wherein the main body has a perimeter that is sized and shaped to engage and mount to a window frame.

13. The method for assembling a window fan of claim 9, wherein a control panel is provided on the main body which is used to control the fan unit, including wind direction and magnitude.

14. The method for assembling a window fan of claim 13, wherein a safety switch electrically connected with the control panel is disposed at a bottom portion of the engaging groove and the window fan can be turned on only when the safety switch is pressed down by the protrusion slid into the engaging groove.

* * * * *